(12) United States Patent
Morihiro

(10) Patent No.: US 11,149,835 B2
(45) Date of Patent: Oct. 19, 2021

(54) BALANCER SHAFT

(71) Applicant: TOYOTA JIDOSHA KABUSHIKI KAISHA, Aichi-ken (JP)

(72) Inventor: Shunji Morihiro, Seto (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/718,026

(22) Filed: Dec. 17, 2019

(65) Prior Publication Data

US 2020/0200250 A1 Jun. 25, 2020

(30) Foreign Application Priority Data

Dec. 20, 2018 (JP) .............................. JP2018-238192

(51) Int. Cl.
| | |
|---|---|
| *F16H 55/14* | (2006.01) |
| *B62D 5/04* | (2006.01) |
| *F16D 3/68* | (2006.01) |
| *F16H 55/06* | (2006.01) |
| *F16F 15/12* | (2006.01) |

(Continued)

(52) U.S. Cl.
CPC ............ F16H 55/14 (2013.01); B62D 5/0409 (2013.01); *F16D 3/68* (2013.01); *F16F 15/12* (2013.01); *F16F 15/264* (2013.01); *F16H 2055/065* (2013.01); *F16H 2057/0213* (2013.01)

(58) Field of Classification Search
CPC ............... F16H 55/14; F16H 2055/065; F16H 2057/0213; F16H 57/043; F16H 57/0006; B62D 5/0409; F16D 3/68; F16F 15/12; F16F 15/264; F16F 15/26; F16F 15/265;
(Continued)

(56) References Cited

U.S. PATENT DOCUMENTS

| | | | |
|---|---|---|---|
| 6,626,139 B1* | 9/2003 | Horita | ..................... F16F 15/12 |
| | | | 123/192.2 |
| 2007/0089699 A1* | 4/2007 | Satoh | ..................... F16F 15/124 |
| | | | 123/192.2 |

(Continued)

FOREIGN PATENT DOCUMENTS

| | | |
|---|---|---|
| EP | 2110532 A2 | 10/2009 |
| JP | 2005201365 A | 7/2005 |

(Continued)

*Primary Examiner* — Syed O Hasan
(74) *Attorney, Agent, or Firm* — Hauptman Ham, LLP

(57) ABSTRACT

A balancer shaft includes a shaft body, a driven gear, a fixed member fixed to the shaft body, and an elastic member located between the driven gear and the fixed body. A projection projects from the driven gear. The fixed member includes an accommodation recess accommodating the projection. The elastic member is arranged in the accommodation recess adjacent to the projection. The projection includes an abutment side surface, which includes an outer end. The outer end and the elastic member are spaced apart in the circumferential direction by a first distance when the abutment side surface and the elastic member are in abutment without elastically deforming the elastic member. The first distance is greater than a maximum value of an elastic deformation amount of the elastic member in the circumferential direction when the elastic member is pressed between the projection and a wall of the accommodation recess.

20 Claims, 5 Drawing Sheets

(51) Int. Cl.
*F16H 57/021* (2012.01)
*F16F 15/26* (2006.01)

(58) Field of Classification Search
CPC ....... F16F 15/124; F02B 75/06; F16C 19/466;
F16C 13/26; F16C 3/20
See application file for complete search history.

(56) References Cited

U.S. PATENT DOCUMENTS

2009/0255503 A1    10/2009   Fujiwara
2015/0143937 A1*   5/2015   Yamanari .............. F16H 57/043
                                                             74/411

FOREIGN PATENT DOCUMENTS

| JP | 2010-101472 A | 5/2010 |
|---|---|---|
| JP | 2010-101473 A | 5/2010 |
| JP | 2010101472 * | 5/2010 |
| WO | 2005031188 A1 | 4/2005 |

* cited by examiner

Other Side ←——→ One Side
Axial Direction

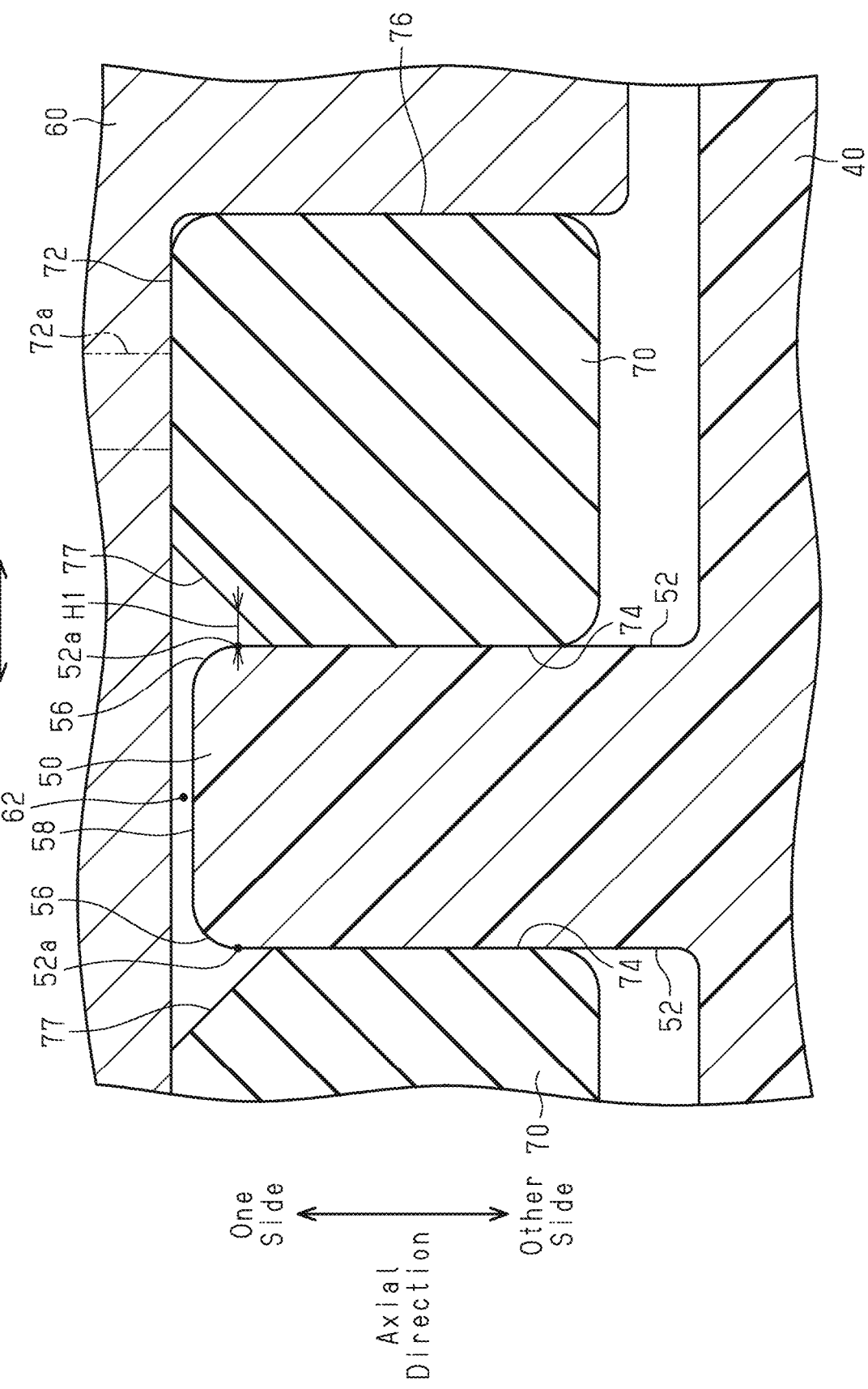

BALANCER SHAFT

RELATED APPLICATIONS

The present application claims priority of Japanese Application Number 2018-238192, filed on Dec. 20, 2018, the disclosure of which is hereby incorporated by reference herein in its entirety.

BACKGROUND ART

The present disclosure relates to a balancer shaft.

Japanese Laid-Open Patent Publication No. 2010-101473 discloses an internal combustion engine that uses a balancer shaft to reduce vibration of the engine. The balancer shaft includes a rod-shaped shaft body. A balancer mass is coupled to the shaft body. The center of gravity of the balancer mass is located at a position separated from the center axis of the shaft body. An annular driven gear, which is rotated and driven by a crankshaft, is arranged toward one side from the balancer mass in an axial direction of the shaft body. The driven gear has a through hole that receives the shaft body. The driven gear is rotatable relative to the shaft body. The driven gear includes an end face located toward one side in the axial direction and projections projecting from the end face. The projections are arranged at intervals in the circumferential direction.

A fixed member is arranged toward one side from the driven gear in the axial direction of the shaft body. The fixed member is fixed to the shaft body and rotated integrally with the shaft body. The fixed member includes recesses that are recessed toward one side in the axial direction of the shaft body to accommodate the projections of the driven gear. The recesses are arranged at intervals in the circumferential direction. The number of the recesses is the same as the number of the projections. An elastic member is accommodated in each recess adjacent to the corresponding projection in the circumferential direction.

When the rotation speed of the crankshaft changes, the elastic member is pressed between the projection of the driven gear and the wall of the recess in the fixed member. This elastically deforms the elastic member. In this case, when force from the driven gear concentrates at a certain location in the elastic member, the elastic may crack from that location.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a balancer shaft includes a shaft body to which a balancer mass is attached. A driven gear through which the shaft body is inserted is configured to be rotated relative to the shaft body. A fixed member is fixed to the shaft body and configured to be rotated integrally with the shaft body. An elastic member is located between the driven gear and the fixed body and configured to transmit torque input from one of the driven gear and the fixed member to the other one of the driven gear and the fixed member. The driven gear includes an end face located toward one side in an axial direction of the shaft body and a projection projecting from the end face of the driven gear toward the one side in the axial direction. The fixed member includes an accommodation recess that is recessed toward the one side in the axial direction to accommodate the projection. The elastic member is arranged in the accommodation recess adjacent to the projection in a circumferential direction of the shaft body. The projection includes an abutment side surface extending in the axial direction, and the elastic member is allowed to abut against the abutment side surface. The abutment side surface includes an end in the axial direction that defines an outer end. The outer end and the elastic member are spaced apart in the circumferential direction by a first distance when the abutment side surface and the elastic member are in abutment without elastically deforming the elastic member. The first distance is greater than a maximum value of an elastic deformation amount of the elastic member in the circumferential direction when the elastic member is pressed between the projection and a wall of the accommodation recess.

In another general aspect, a balancer shaft includes a shaft body to which a balancer mass is attached. A driven gear through which the shaft body is inserted is configured to be rotated relative to the shaft body. A projection projects from an end face of the driven gear toward one side in an axial direction of the shaft body. An elastic member is adjacent to the projection in a circumferential direction of the shaft body. A fixed member is arranged at one side in the axial direction as viewed from the driven gear. The fixed member is fixed to the shaft body. The fixed member includes an accommodation recess accommodating at least part of the projection and the elastic member. The fixed member is configured to be rotated integrally with the shaft body. The projection includes an abutment side surface extending in the axial direction. When the driven gear is rotated, the abutment side surface of the projection abuts against the elastic member and presses the elastic member against a wall of the accommodation recess to transmit torque from the driven gear to the fixed member. The abutment side surface includes a basal end region that is continuous with the end face of the driven gear, an intermediate region that is continuous with the basal end region, and a distal end region that is continuous with the intermediate region. The distal end region of the abutment side surface includes an outer end at the first side in the axial direction. The outer end and the elastic member are spaced apart in the circumferential direction by a first distance when the intermediate region of the abutment side surface and the elastic member are in abutment without elastically deforming the elastic member. The first distance is set so that the elastic member does not abut against the outer end even when the elastic member is elastically deformed by a maximum amount.

Other features and aspects will be apparent from the following detailed description, the drawings, and the claims.

BRIEF DESCRIPTION OF THE DRAWINGS

FIG. 5 is a cross-sectional view taken along line 5-5 in FIG. 4.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a balancer shaft will now be described with reference to the drawings. This embodiment is an example applied to an inline four-cylinder internal combustion engine, and the balancer shaft is for use with such an internal combustion engine. In this specification, one side in the axial direction of the shaft body 22 is also referred to as the first side in the axial direction, and the other side in the axial direction of the shaft body 22 is also referred to as the second side in the axial direction.

Figure 1:
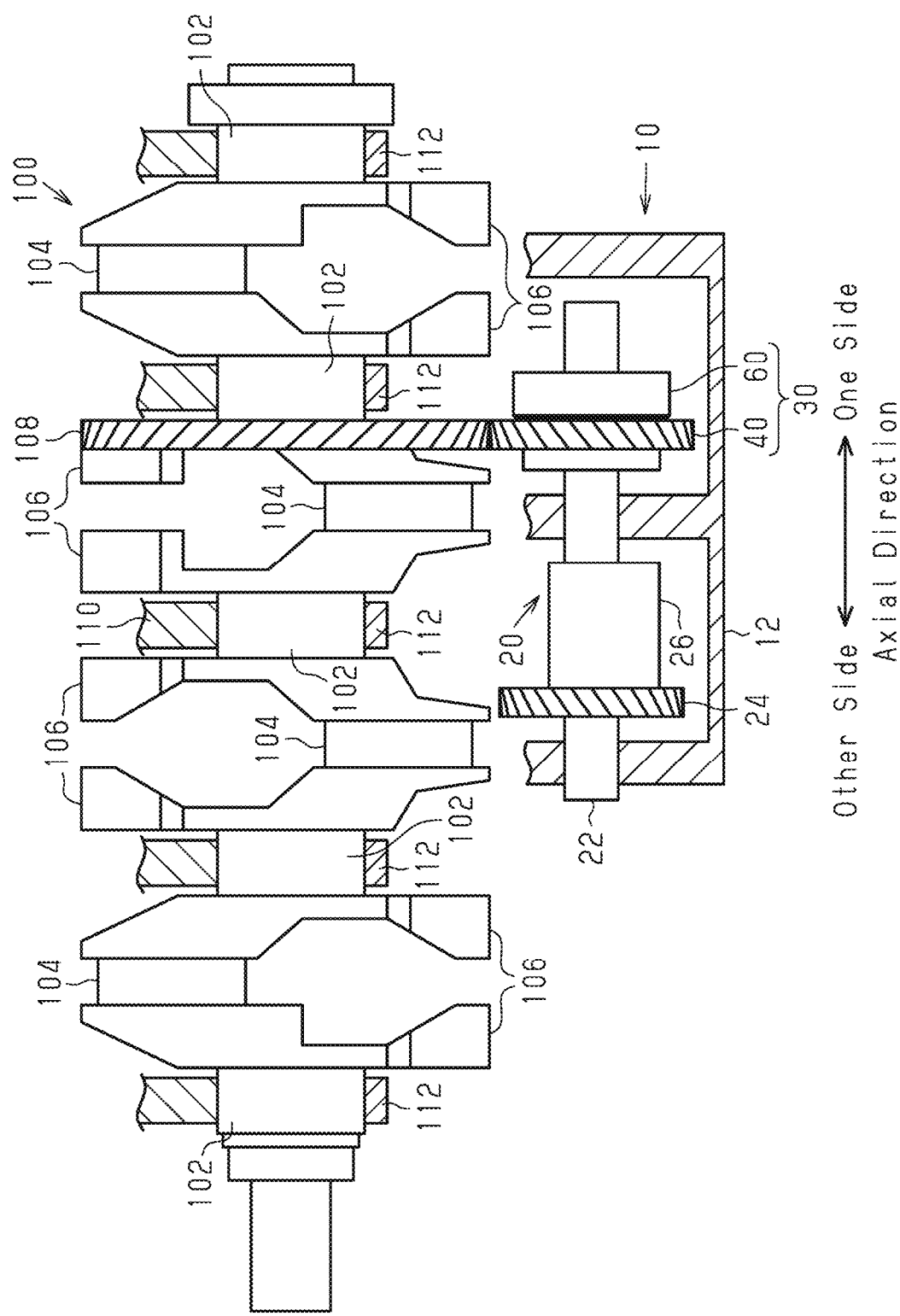
FIG. 1 is a schematic diagram showing a crankshaft of an internal combustion engine.

The structure around a crankshaft of the internal combustion engine will first be described. Referring to FIG. 1, a crankshaft 100 is arranged at a lower end of a cylinder block 110 of the internal combustion engine. The crankshaft 100 includes journals 102, which are co-axial with the crankshaft 100, crankpins 104, which are coupled to pistons reciprocated in cylinders, and crank arms 106, which connect the journals 102 and the crankpins 104. The crankshaft 100 is repetitively bent extending in the same direction as a whole. The journals 102 of the crankshaft 100 re rotatably supported by the cylinder block 110 and a crank cap 112, which is attached to the cylinder block 110. In this embodiment, the internal combustion engine includes four sets of a journal 102, a crankpin 104, and a pair of crank arms 106, with each set corresponding to one of the four cylinders of the internal combustion engine. In addition to the above-described four sets, a journal 102 is arranged on an end of the crankshaft 100. Thus, the number of the journals 102 is one more than the number of the cylinders.

A drive gear 108, which is circular in a plan view, is coupled to the crankshaft 100. The drive gear 108 is located between a third one and a fourth one of the four sets of the journal 102 and the like from the end located toward the second side in the axial direction of the crankshaft 100. The drive gear 108 is fixed to the corresponding journal 102 and rotated integrally with the journal 102. Teeth are formed on the outer circumferential surface of the drive gear 108.

A balancer device 10 is arranged downward from the crankshaft 100 in the internal combustion engine to reduce vibration of the internal combustion engine. The balancer device 10 includes a housing 12 that is box-shaped as a whole. The housing 12 is fixed by bolts or the like to the lower end of the cylinder block 110. A first balancer shaft 20 and a second balancer shaft are accommodated in the housing 12. FIG. 1 shows part of the housing 12 and does not show the second balancer shaft.

The first balancer shaft 20 includes a shaft body 22 that is rod-shaped as a whole. The center axis of the shaft body 22 is parallel to the center axis of the crankshaft 100. The shaft body 22 is rotatably supported by the housing 12. The shaft body 22 includes one end located in the housing 12 and another end extending through an outer wall of the housing 12.

A connecting gear 24, which is circular in a plan view, is attached to the circumferential surface of the shaft body 22. In the axial direction of the shaft body 22 (hereinafter simply referred to as the axial direction), the connecting gear 24 is located toward the second side (left side in FIG. 1) from the middle of the shaft body 22. The center axis of the connecting gear 24 coincides with the center axis of the shaft body 22. Teeth are formed on the outer circumferential surface of the connecting gear 24. The connecting gear 24 is fixed to the shaft body 22 and rotated integrally with the shaft body 22.

A balancer mass 26 is fixed to the circumferential surface of the shaft body 22 toward the first side in the axial direction from the connecting gear 24. The balancer mass 26 has the shape of a circular sector in a plan view taken in the axial direction. The balancer mass 26 is fixed to the circumferential surface of the shaft body 22 so that the smaller portion of the circular sector is closer to the axis of the shaft body 22. As a result, the center of gravity of the balancer mass 26 is located at a position separated from the center axis of the shaft body 22.

A power transmission mechanism 30 is arranged on the outer circumferential surface of the shaft body 22 toward the first side in the axial direction from the balancer mass 26 to transmit rotational force of the crankshaft 100 to the shaft body 22. The power transmission mechanism 30 will be described in detail later.

The second balancer shaft is arranged adjacent to the first balancer shaft 20. The first balancer shaft 20 and the second balancer shaft extend parallel to each other. The second balancer shaft has the same structure as the first balancer shaft 20 except in that the second balancer shaft does not include the power transmission mechanism 30. The second balancer shaft includes a connecting gear that is meshed with the connecting gear 24 of the first balancer shaft 20. Accordingly, rotation of the crankshaft 100 is transmitted to the first balancer shaft 20. This rotates the first balancer shaft 20 together with the second balancer shaft.

The power transmission mechanism 30 will now be described.

Figure 2:
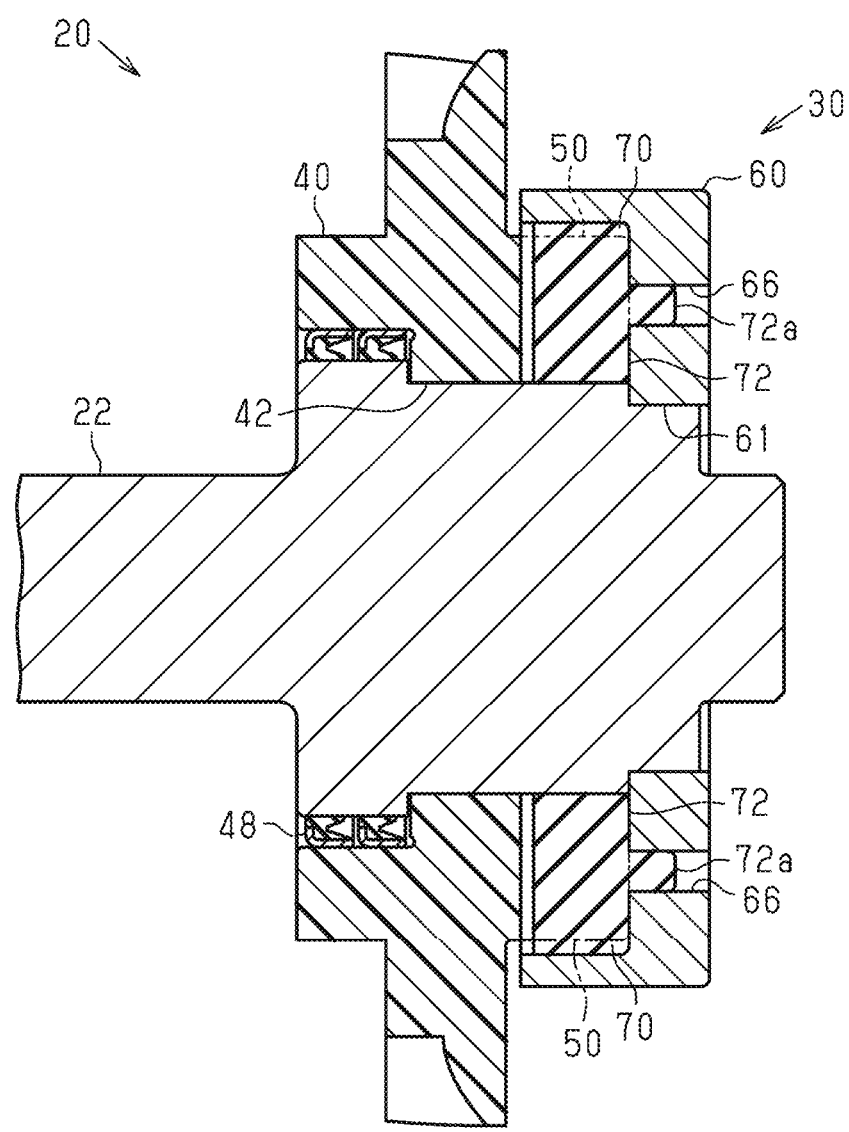
FIG. 2 is an exploded perspective view showing a portion of a balancer shaft that located toward one side in an axial direction.
Figure 3:
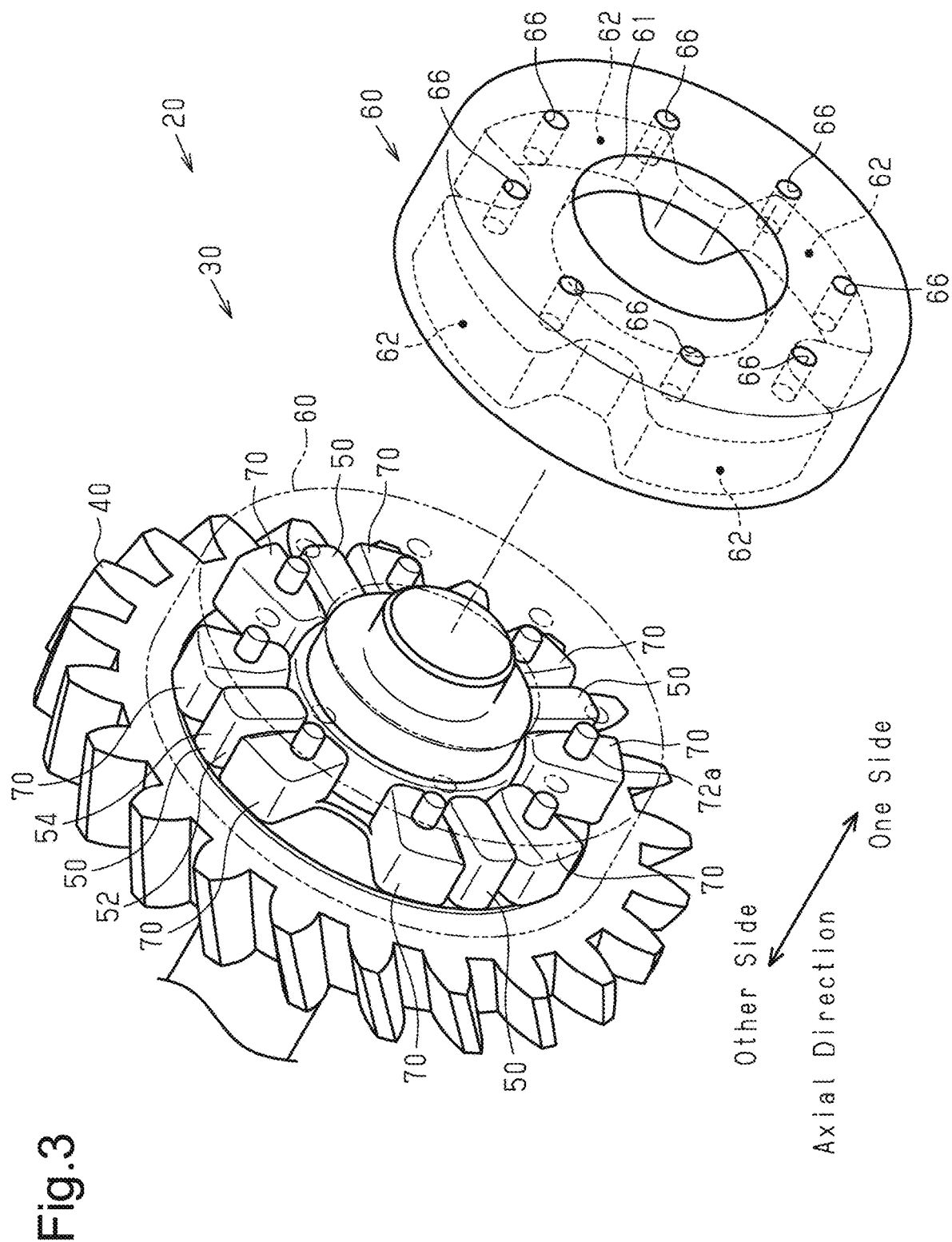
FIG. 3 is an exploded perspective view showing a portion of the balancer shaft that is located toward one side in the axial direction.

As shown in FIGS. 2 and 3, the power transmission mechanism 30 includes a driven gear 40 that is rotated and driven by the drive gear 108. Referring to FIG. 2, the driven gear 40 is an external gear. A through hole 42 extends through the center of the driven gear 40. The shaft body 22 is inserted through the through hole 42 of the driven gear 40. The center axis of the driven gear 40 coincides with the center axis of the shaft body 22. In this embodiment, the inner side of the driven gear 40 in the radial direction of the shaft body 22 (hereinafter simply referred to as the radial direction) is formed from a metal, and the teeth that is the portion at the outer side of the driven gear 40 in the radial direction is formed from a resin.

A ring-shaped friction damper 48 is located between the inner circumferential surface of the driven gear 40 and the outer circumferential surface of the shaft body 22. The friction damper 48 restricts friction between the driven gear 40 and the shaft body 22. The driven gear 40 is not fixed to the shaft body 22 and rotatable relative to the shaft body 22.

As shown in FIG. 3, the end face of the driven gear 40 located at the first side in the axial direction includes projections 50 projecting toward the first side in the axial direction. Each projection 50 is box-shaped as a whole. There are four projections 50 arranged at equal intervals in the circumferential direction of the shaft body 22 (hereinafter simply referred to as the circumferential direction).

As shown in FIG. 2, a fixed member 60 is arranged on the shaft body 22 toward the first side in the axial direction from the driven gear 40. As shown in FIG. 3, the fixed member 60 is ring-shaped as a whole. A through hole 61 extends through the central portion of the fixed member 60. The shaft body 22 is inserted through the through hole 61. The center axis of the fixed member 60 coincides with the center axis of the shaft body 22. The inner circumferential surface of the fixed member 60 is fixed to the outer circumferential surface of the shaft body 22. Accordingly, the fixed member 60 is rotated integrally with the shaft body 22. The double-dashed lines in FIG. 3 hypothetically show the fixed member 60 in a state attached to the shaft body 22.

As shown in FIG. 3, the end face of the fixed member 60 located at the second side in the axial direction includes accommodation recesses 62 recessed toward the first side in the axial direction at positions opposing the projections 50 of the driven gear 40. The number of the accommodation recesses 62 is the same as the number of the projections 50 of the driven gear 40. That is, the accommodation recesses 62 are arranged at equal intervals in the circumferential direction. The dimension of each accommodation recess 62 in the circumferential direction is larger than the dimension of each projection 50 in the circumferential direction. Further, the dimension of each accommodation recess 62 in the radial direction is larger than the dimension of each projection 50 in the radial direction. In this embodiment, the accommodation recesses 62 are connected to the through hole 61. That is, the accommodation recesses 62 extend in the radial direction to the through hole 61. Further, in a view taken in the axial direction, the radially outer edge of each accommodation recess 62 is located outward in the radial direction from the radially outer edge of each projection 50. The recessed depth (dimension in axial direction) of each accommodation recess 62 is greater than the projected length of each projection 50.

A positioning hole 66 extends from the bottom surface (surface at first side in axial direction) of each accommodation recess 62. The positioning holes 66 extend to the end face of the fixed member 60 located at the first side in the axial direction. That is, the positioning holes 66 extend through the fixed member 60 in the axial direction. Two positioning holes 66 are provided for each accommodation recess 62. The two positioning holes 66 are located toward the two sides from the middle of the accommodation recess 62 in the circumferential direction.

As shown in FIG. 2, the fixed member 60 is fixed to the shaft body 22 at a location in the circumferential direction where the projections 50 of the driven gear 40 are accommodated in the accommodation recesses 62. The fixed member 60 is fixed to the shaft body 22 so that the end face at the second side in the axial direction does not contact the driven gear 40.

Figure 4:
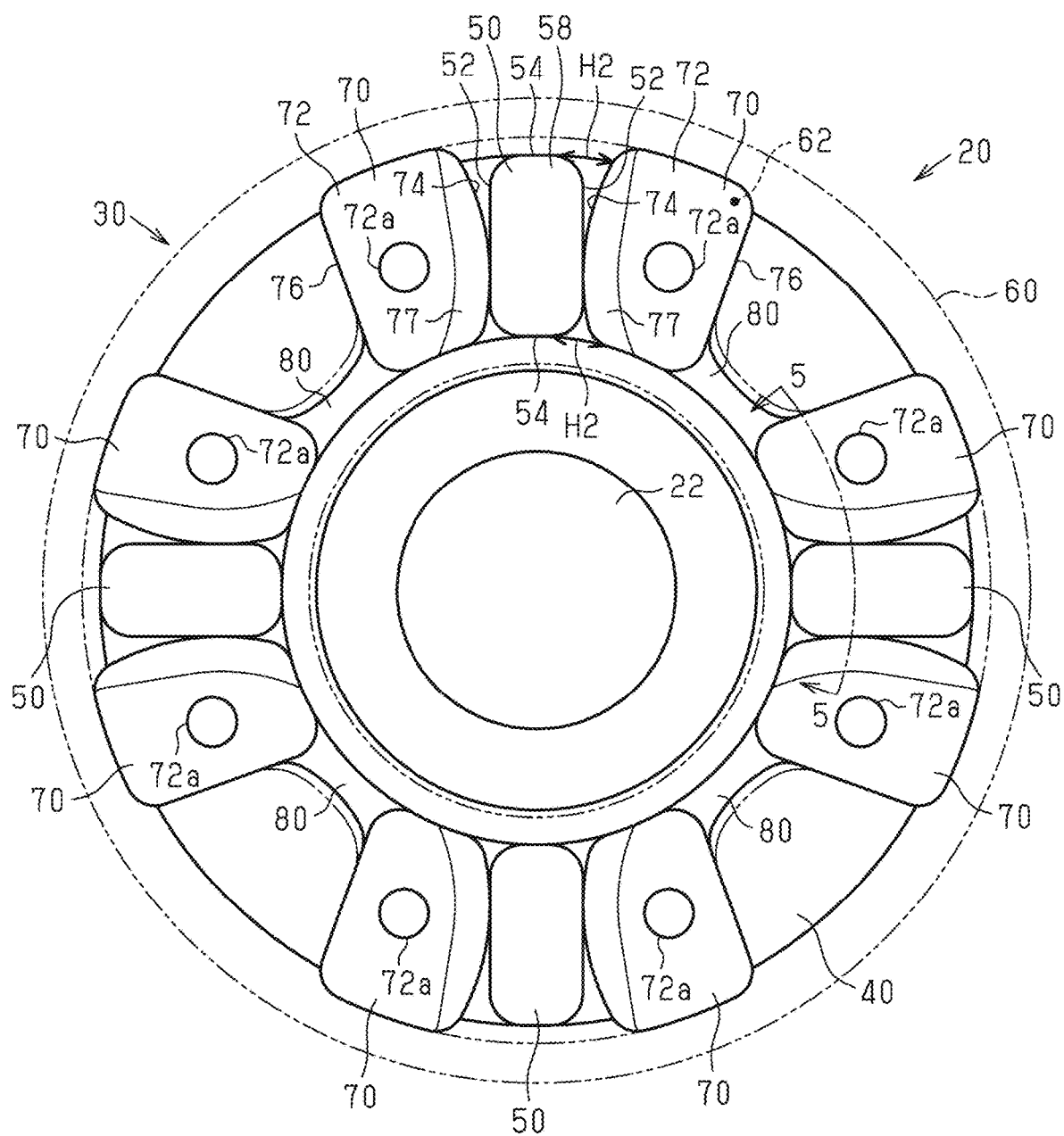
FIG. 4 is a plan view of the balancer shaft taken from one side in the axial direction.

As shown in FIG. 4, elastic members 70 are accommodated in the accommodation recesses 62 together with the projections 50. In detail, the elastic members 70 are accommodated in the accommodation recesses 62 adjacent to the projections 50 in the circumferential direction. Each elastic member 70 is box-shaped as a whole. An elastic member 70 is arranged on each of the two sides of each projection 50 in the circumferential direction. Accordingly, each accommodation recesses 62 includes two walls in the circumferential direction, and each elastic member 70 is located between one of the projections 50 and a corresponding one of the walls. When the rotation speed of the crankshaft 100 changes and rotates the driven gear 40 relative to the fixed member 60, the elastic members 70 are pressed between the projections 50 and the walls of the accommodation recesses 62. This elastically deforms the elastic members 70. The elastic members 70 reduce the torque input from one of the driven gear 40 and the fixed member 60 and transmit the reduced torque to the other one of the driven gear 40 and the fixed member 60. The elastic members 70 are formed from, for example, fluoro rubber. In FIG. 4, the fixed member 60 is shown by the double-dashed lines. The outer circumferential portion of the driven gear 40 is not shown in FIG. 4.

There are four projections 50 and a total of eight elastic members 70. The eight elastic members 70 are divided into four groups. As shown in FIG. 4, each group includes two elastic members 70 that are adjacent to each other in the circumferential direction and connected by a connecting member 80. More specifically, the two elastic members 70 in each group are connected to each other at a radially inner portion. Further, the two elastic members 70 in each group are accommodated in separate accommodation recesses 62. The connecting members 80 are formed from the same material as the elastic members 70.

As shown in FIG. 2, each elastic member 70 includes a top surface 72 that is the outer surface of the elastic member 70 at the first side in the axial direction. The top surface 72 abuts against the bottom surface of the corresponding accommodation recess 62 in the fixed member 60. A cylindrical positioning projection 72a projects from the top surface 72. The positioning projection 72a is inserted into the corresponding positioning hole 66 of the fixed member 60. This positions the elastic member 70 in the corresponding accommodation recess 62.

Further, as shown in FIG. 4, each elastic member 70 includes two side surfaces in the circumferential direction, namely, a first side surface 74 and a second side surface 76. The first side surface 74 is located toward the corresponding projection 50 of the driven gear 40 and abuts the projection 50. The second side surface 76 is opposite to the first side surface 74 and abuts the wall of the corresponding accommodation recess 62 in the fixed member 60. The first side surface 74 is curved to be farther from the projection 50 as the two ends in the radial direction become closer. More specifically, the first side surface 74 is curved to be farther from the projection 50 toward the inner side in the radial direction and farther from the projection 50 toward the outer side in the radial direction.

As shown in FIG. 5, a beveled surface 77 is located between the first side surface 74 and the top surface 72 of each elastic member 70. The beveled surface 77 extends from the top surface 72 toward the corresponding projection 50. More specifically, the beveled surface 77 extends farther from the projection 50 toward the first side in the axial direction. In this embodiment, the beveled surface 77 is substantially planar and inclined relative to both of the first side surface 74 and the top surface 72.

As shown in FIG. 5, each projection 50 includes two abutment side surfaces 52 that are the two sides surfaces in the circumferential direction. Each abutment side surface 52 abuts against the corresponding elastic member 70. The abutment side surfaces 52 rise at a substantially right angle from the end face of the driven gear 40 at the first side in the axial direction. Thus, the abutment side surfaces 52 extend in the axial direction.

As shown in FIG. 4, each abutment side surface 52 includes a flat central portion in the radial direction. The abutment side surface 52 includes a first end region, located at the inner side in the radial direction, and a second end region, located at the outer side in the radial direction. Further, the abutment side surface 52 includes a first end, located at the inner side in the radial direction, and a second end, located at the outer side in the radial direction. The first end region is defined by a curved surface that is curved to be farther from the corresponding elastic member 70 as the first end becomes closer. More specifically, the first end region is defined by a curved surface that is curved to be farther from the corresponding elastic member 70 toward the inner side in the radial direction. The second end region is defined by a curved surface that is curved to be farther from the corresponding elastic member 70 as the second end becomes closer. More specifically, the second end region is defined by a curved surface that is curved to be farther from the corresponding elastic member 70 toward the outer side in the radial direction. The first end and the second end of the abutment side surface 52 are respectively connected to two side surfaces 54 of the corresponding projection 50 in the radial direction. In this embodiment, each side surface 54 is generally planar.

The end of each abutment side surface 52 at the first side in the axial direction is referred to as the outer end 52a. As shown in FIG. 5, the outer end 52a is located in a range in the axial direction where the beveled surface 77 of the corresponding elastic member 70 is located. Thus, the outer end 52a is opposed to the beveled surface 77 of the corresponding elastic member 70 in the circumferential direction. Each abutment side surface 52 includes a basal end region that is continuous with the end face of the driven gear 40, an intermediate region that is continuous with the basal end region, and a distal end region that is continuous with the intermediate region. The distal end region of the abutment side surfaces 52 includes the outer end 52a at the first side in the axial direction.

Each projection 50 includes a distal end face 58 extending orthogonally to the abutment side surfaces 52. The bordering portion of the distal end face 58 and each abutment side surface 52 is rounded as an arcuate surface 56. Thus, each projection 50 includes the distal end face 58, which is opposed to the fixed member 60 in the axial direction, and the arcuate surface 56, which connects the distal end face 58 and the outer end 52a. The arcuate surface 56 is defined by a curved surface that is curved to be farther from the corresponding elastic member 70 toward the first side in the axial direction.

Referring to FIG. 5, the outer end 52a of each projection 50 is spaced apart from the corresponding elastic member 70 in the circumferential direction by a first distance H1 that is set in accordance with the elastic deformation amount of the elastic member 70. More specifically, under the assumption that the abutment side surfaces 52 of the projections 50 and the first side surfaces 74 of the elastic members 70 are in abutment without elastically deforming the elastic members 70, the first distance H1 is the distance in the circumferential direction from the outer end 52a of each projection 50 to the corresponding elastic member 70. The first distance H1 is greater than a maximum value of the elastic deformation amount of the elastic member 70 in the circumferential direction when the elastic member 70 is pressed between the projection 50 and the wall of the corresponding accommodation recess 62. Consequently, under the above assumption, the distance from the end of the arcuate surface 56 at the first side in the axial direction to the elastic member 70 in the circumferential direction is also greater than the maximum value of the elastic deformation amount of the elastic member 70 in the circumferential direction when the elastic member 70 is pressed between the projection 50 and the wall of the corresponding accommodation recess 62.

The maximum value of the elastic deformation amount of the elastic member 70 is determined by the maximum torque applied to the elastic member 70 in the circumferential direction, the shape and dimensions of the elastic member 70, the material of the elastic member 70, and the like. The maximum torque applied to the elastic member 70 is the torque applied to the elastic member 70 when the increase rate of the rotation speed of the crankshaft 100 (driven gear 40) is the maximum in the normal operational range of the internal combustion engine, for example, when the vehicle is suddenly accelerated. Thus, the maximum value of the elastic deformation amount of the elastic member 70 corresponds to the elastic deformation amount of the elastic member 70 when the torque input by the projection 50 or the wall of the accommodation recess 62 to the elastic member 70 is the maximum torque.

As described above, the first side surfaces 74 of the elastic members 70 are curved. Thus, the first distance H1 varies in the radial direction of the elastic member 70. In this embodiment, the first distance H1 is set to be 10% or greater than the maximum circumferential dimension of each elastic member 70 even at a location where the first distance H1 is the minimum in the radial direction.

Further, as shown in FIG. 4, each abutment side surface 52 includes the first end, located at the inner side in the radial direction, and the second end, located at the outer side in the radial direction. The distance from each of the first end and the second end to the corresponding elastic member 70 in the circumferential direction is referred to as the second distance H1. The second distance H2 is set in accordance with the elastic deformation amount of each elastic member 70. More specifically, under the assumption that the abutment side surfaces 52 of the projections 50 and the first side surfaces 74 of the elastic members 70 are in abutment without elastically deforming the elastic members 70, the second distance H2 is the distance in the circumferential direction from each of the first end and the second end to the corresponding elastic member 70. The second distance H2 is greater than a maximum value of the elastic deformation amount of the elastic member 70 in the circumferential direction when the elastic member 70 is pressed between the projection 50 and the wall of the corresponding accommodation recess 62. The maximum value is described above. In this embodiment, the second distance H2 from the first end of the abutment side surface 52 at the radially inner side to the elastic member 70 is set to be 10% or greater than the maximum circumferential dimension of the elastic member 70. Further, the second distance H2 from the second end of the abutment side surface 52 at the radially outer side to the elastic member 70 is set to be 10% or greater than the maximum circumferential dimension of the elastic member 70.

The operation and advantages of the present embodiment will now be described.

(1) When the rotation speed of the crankshaft 100 changes and the elastic members 70 are thereby pressed and elastically deformed between the abutment side surfaces 52 of the projections 50 and the walls of the accommodation recesses 62, the elastic members 70 and the abutment side surfaces 52 of the projections 50 are pressed against one another. In this case, when stress concentrates at a certain location of an elastic member 70, the elastic member 70 may crack from that location.

In the above structure, the abutment side surfaces 52 of the projections 50 each include the first end region, located at the inner side in the radial direction, and the second end region, located at the outer side in the radial direction. Each abutment side surface 52 includes a flat central portion, which excludes the two end regions. The outer end 52a of each abutment side surface 52 is the boundary between the flat surface of the abutment side surface 52 and the curved surface of the arcuate surface 56. As shown in FIG. 5, the flat surface forming the abutment side surface 52, the outer end 52a of the abutment side surfaces 52, and the curved surface forming the arcuate surface 56 are lined in the axial direction. Accordingly, the outer end 52a of the abutment side surface 52 is where the shape of the surface changes and is relatively sharper than the flat abutment side surface 52. Accordingly, when the elastic member 70 abuts against the outer end 52a of the abutment side surface 52, stress concentrates at the location where the elastic member 70 abuts against the outer end 52a.

In the above structure, the first distance H1, which is the distance between the outer end 52a of the abutment side surface 52 and the corresponding elastic member 70 in the circumferential direction, is larger than the maximum value of the elastic deformation amount of the elastic member 70. Accordingly, when the elastic member 70 is elastically deformed, the elastic member 70 does not abut against the outer end 52a of the abutment side surface 52.

When, for example, the characteristics of the elastic member 70 change over time thereby increasing the elastic deformation amount of the elastic member 70, the elastic member 70 may abut against the outer end 52a of the projection 50 or the arcuate surface 56, which is located toward the first side in the axial direction from the outer end 52a. However, in the present embodiment, the arcuate surface 56, which is located on the projection 50 toward the first side in the axial direction from the outer end 52a, is curved. Thus, even if the elastic member 70 abuts against the arcuate surface 56 of the projection 50, the elastic member 70 will most likely not crack from the location of abutment with the arcuate surface 56.

(2) In the above structure, the abutment side surfaces 52 of the projections 50 each include the first end region, located at the inner side in the radial direction, and the second end region, located at the outer side in the radial direction, and the first end region and second end region are curved surfaces. Further, in the above structure, each elastic member 70 includes the first side surface 74 abut against the corresponding projection 50 and curved to be farther from the projection 50 as the ends in the radial direction become closer. More specifically, the first side surface 74 is curved to be farther from the projection 50 toward the inner side in the radial direction and farther from the projection 50 toward the outer side in the radial direction. Thus, even when the elastic members 70 elastically deform, the elastic members 70 will most likely not reach the two end regions in the abutment side surfaces 52 of the projections 50. Additionally, in the above structure, each abutment side surface 52 includes the radially inner first end and the radially outer second end. The second distance H2, which is the distance from each of the first end and the second end, to the corresponding elastic member 70 in the circumferential direction, is larger than the maximum value of the elastic deformation amount of the elastic member 70. Thus, the first end region and second end region of the abutment side surface 52 each have a radius of curvature that is large enough so that the elastic member 70 does not reach the first end and second end of the abutment side surface 52 even when the elastic member 70 is elastically deformed by the maximum amount. With such a curved surface, when the elastic member 70 is elastically deformed and abut against the two end regions of the abutment side surface 52, stress will most likely not be concentrated at a certain location on the elastic member 70.

(3) The elastic members 70 are designed so that plastic deformation does not occur. When the elastic members 70 are formed from fluoro rubber and the elastic deformation amount (compression amount) of the elastic members 70 exceeds several percent, plastic deformation may occur in the elastic members 70. Thus, when the elastic members 70 are formed from fluoro rubber, the elastic deformation amount of the elastic members 70 in the circumferential direction is approximately several percent at maximum. Accordingly, in the above structure, the outer ends 52a of each projection 50 can be designed to be spaced apart in the circumferential direction from the corresponding elastic members 70 by a distance (first distance H1) that is 10% or greater than the maximum circumferential dimension of each elastic member 70. This ensures that the elastic members 70 do not abut against the outer ends 52a of the projections 50 when the elastic members 70 are elastically deformed and eliminates the need to perform complicated tests and simulations. In the same manner, the first end and the second end of each abutment side surface 52 can be designed to be spaced apart in the circumferential direction from the corresponding elastic member 70 by a distance (second distance H2) that is 10% or greater than the maximum circumferential dimension of each elastic member 70. This allows each of the first end region and second end region of the abutment side surface 52 to have a radius of curvature that is large enough so that the elastic member 70 does not reach the ends of the abutment side surface 52 when the elastic member 70 is elastically deformed and eliminates the need to perform complicated tests and simulations.

(4) When coupling the fixed member 60 to the shaft body 22, the positioning holes 66 of the fixed member 60 are used to position the elastic members 70 in the accommodation recesses 62 of the fixed member 60 in advance. In this state, the fixed member 60 and the shaft body 22 are moved in the axial direction so that the projections 50 are located between the two elastic members 70 in each accommodation recess 62. Each projection 50 enters the space between the two corresponding elastic members 70 from the distal end face 58. In the above structure, the arcuate surfaces 56 are located between the abutment side surfaces 52 and the distal end face 58 in each projection 50. As a result, the distal end portion of the projection 50 narrows toward the end in the projecting direction. This allows the projection 50 to smoothly enter the space between the two corresponding elastic members 70.

The above embodiment may be modified as described below. The above embodiment and the modified examples described below may be combined as long as there is no technical contradiction.

The shape of the projections 50 is not limited to that of the above embodiment as long as the first distance H1 is obtained based on the maximum elastic deformation amount of the elastic members 70. For example, the two abutment side surfaces 52 of each projection 50 may be directly connected at the two end regions in the radial direction. In other words, the two abutment side surfaces 52 of the projection 50 may be directly connected at the radially inner side and the radially outer side.

The arcuate surface 56 between each abutment side surface 52 and the corresponding distal end face 58 may be eliminated. That is, the bordering portion between each abutment side surface 52 and the distal end face 58 does not have to be rounded. In this case, the outer end 52*a* of each abutment side surface 52 is connected to the distal end face 58.

Each abutment side surface 52 may include a flat portion or the like extending in the axial direction. Part of the abutment side surface 52 may be a flat portion extending in the axial direction and the remaining part of the abutment side surface 52 may be changed in shape. For example, the end region of each abutment side surface 52 at the second side in the axial direction may be inclined so as to be located further outward from the projection 50 as the end at the second side becomes closer.

The two end regions of each abutment side surface 52 at the radially inner side and the radially outer side do not have to be curved. The curved shape of one or both of the radially inner side and radially outer side of the abutment side surface 52 may be changed to a flat shape.

Each abutment side surface 52 includes the first end, located at the radially inner side, and the second end, located at the radially outer side. The second distance H2 from each of the first end and the second end to the corresponding elastic member 70 is not limited to the example of the above embodiment. For example, the second distance H2 may be 10% greater than or less than the maximum circumferential dimension of the elastic members 70. Further, the second distance H2 may be less than or equal to the maximum value of the elastic deformation amount of the elastic members 70. Regardless of the second distance H2, the concentration of stress at a certain location in each elastic member 70 can be avoided as long as the first distance H1 is greater than the maximum value of the elastic deformation amount of the elastic member 70.

The first distance H1 is not limited to that of the above embodiment. For example, the first distance H1 may be 10% greater than or 10% less than the maximum circumferential dimension of the elastic members 70. Even if the elastic members 70 are formed from fluoro rubber, when, for example, the characteristics of the elastic member 70 change over time, the elastic deformation amount (compression amount) of the elastic members 70 in the circumferential direction may exceed 10%. The first distance H1 may be set based on the elastic deformation amount of the elastic members 70. Further, the first distance H1 only needs to be greater than the maximum value of the elastic deformation amount of the elastic members 70.

When the first distance H1 is excessively long, dead space may be formed in the accommodation recesses 62. When the elastic members 70 are formed from fluoro rubber, the first distance H1 should be 50% or less of the maximum circumferential dimension of the elastic members 70. The same applies to the second distance H2.

The material of the elastic members 70 is not limited to the example of the above embodiment. The elastic members 70 may be formed from any material that can reduce the torque input from one of the projections 50 (driven gear 40) and the walls of the accommodation recesses 62 (fixed member 60) and transmit the reduced torque to the other one of the projections 50 and the walls of the accommodation recesses 62. When changing the material of the elastic members 70, the first distance H1 and the second distance H2 may be changed accordingly.

The shape of the elastic members 70 is not limited to the example of the above embodiment. The elastic members 70 may be formed to transmit torque between the projections 50 and the walls of the accommodation recesses 62. For example, the first side surfaces 74 of the elastic members 70 may be flat.

Three or more elastic members 70 may be connected by the connecting member 80. For example, the adjacent elastic members 70 may all be connected by the connecting member 80 so that the eight elastic members 70 all form an integrated molded product. Further, the connecting members 80 of the above embodiment may be eliminated, and there may be eight separate connecting members 80 instead.

The shape of the fixed member 60 is not limited to the example of the above embodiment. The fixed member 60 may include the through hole 61, the accommodation recesses 62, and the like. For example, a wall may extend between the accommodation recesses 62 and the through hole 61 to close the radially inner side of the accommodation recesses 62.

When the projections 50, the elastic members 70, or the accommodation recesses 62 are changed in shape like in the above modified example and in a state in which the elastic members 70 are not elastically deformed, open space may extend between the first side surfaces 74 of the elastic members 70 and the projections 50. In the same manner, open space may extend between the second side surfaces 76 of the elastic members 70 and the walls of the accommodation recesses 62.

The distance between adjacent accommodation recesses 62 in the circumferential direction may be changed from that of the above embodiment. More specifically, the four accommodation recesses 62 may be positioned in the circumferential direction so that the distance between the accommodation recesses 62 is not equal. The accommodation recesses 62 only need to be located where the projections 50 and the elastic members 70 can be accommodated.

The distance between adjacent projections 50 in the circumferential direction may be changed from that of the above embodiment. For example, the four projections 50 may be positioned in the circumferential direction so that the distance between adjacent projections 50 is not equal.

The number of projections 50 may be changed, and the number of the accommodation recesses 62 and the elastic members 70 may be changed in correspondence with the number of the projections 50.

The radially inner portion and the radially outer portion of the driven gear 40 may be formed from the same material.

The power transmission mechanism 30 may be applied to a balancer shaft of an internal combustion engine that is not an inline four-cylinder internal combustion engine. For example, the power transmission mechanism 30 may be applied to a balancer shaft of an inline three-cylinder internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A balancer shaft comprising:
a shaft body to which a balancer mass is attached;
a driven gear through which the shaft body is inserted and configured to be rotated relative to the shaft body;
a fixed member fixed to the shaft body and configured to be rotated integrally with the shaft body; and
an elastic member located between the driven gear and the fixed body and configured to transmit torque input from one of the driven gear and the fixed member to the other one of the driven gear and the fixed member, wherein
the driven gear includes an end face located toward one side in an axial direction of the shaft body and a projection projecting from the end face of the driven gear toward the one side in the axial direction,
the fixed member includes an accommodation recess that is recessed toward the one side in the axial direction to accommodate the projection,
the elastic member is arranged in the accommodation recess adjacent to the projection in a circumferential direction of the shaft body,
the projection includes an abutment side surface extending in the axial direction, and the elastic member is allowed to abut against the abutment side surface,
the abutment side surface includes an end in the axial direction that defines an outer end,
the outer end and the elastic member are spaced apart in the circumferential direction by a first distance when the abutment side surface and the elastic member are in abutment without elastically deforming the elastic member, wherein the abutment side surface and the elastic member are in abutment during an entire period of operation, and
the first distance is greater than a maximum value of an elastic deformation amount of the elastic member in the circumferential direction when the elastic member is pressed between the projection and a wall of the accommodation recess.

2. The balancer shaft according to claim 1, wherein
the elastic member is formed from fluoro rubber, and
the first distance is 10% or greater than a maximum dimension of the elastic member in the circumferential direction.

3. A balancer shaft comprising:
a shaft body to which a balancer mass is attached;
a driven gear through which the shaft body is inserted and configured to be rotated relative to the shaft body;
a fixed member fixed to the shaft body and configured to be rotated integrally with the shaft body; and
an elastic member located between the driven gear and the fixed body and configured to transmit torque input from one of the driven gear and the fixed member to the other one of the driven gear and the fixed member, wherein
the driven gear includes an end face located toward one side in an axial direction of the shaft body and a projection projecting from the end face of the driven gear toward the one side in the axial direction,
the fixed member includes an accommodation recess that is recessed toward the one side in the axial direction to accommodate the projection,
the elastic member is arranged in the accommodation recess adjacent to the projection in a circumferential direction of the shaft body,
the projection includes an abutment side surface extending in the axial direction, and the elastic member is allowed to abut against the abutment side surface,
the abutment side surface includes an end in the axial direction that defines an outer end,
the outer end and the elastic member are spaced apart in the circumferential direction by a first distance when the abutment side surface and the elastic member are in abutment without elastically deforming the elastic member, and
the first distance is greater than a maximum value of an elastic deformation amount of the elastic member in the circumferential direction when the elastic member is pressed between the projection and a wall of the accommodation recess, wherein:
the abutment side surface includes a first end region, located at an inner side in a radial direction of the shaft body, and a second end region, located at an outer side in the radial direction of the shaft body;
the abutment side surface includes a first end, located at the inner side in the radial direction of the shaft body, and a second end, located at the outer side in the radial direction of the shaft body;
the first end region is curved to be farther from the elastic member as the first end becomes closer to the elastic member, and the second end region is curved to be farther from the elastic member as the second end becomes closer to the elastic member;
each of the first end and the second end is spaced apart from the elastic member in the circumferential direction by a second distance when the abutment side surface and the elastic member are in abutment without elastically deforming the elastic member; and
the second distance is greater than the maximum value.

4. The balancer shaft according to claim 3, wherein
the elastic member is formed from fluoro rubber, and
the second distance is 10% or greater than a maximum dimension of the elastic member in the circumferential direction.

5. A balancer shaft comprising:
a shaft body to which a balancer mass is attached;
a driven gear through which the shaft body is inserted and configured to be rotated relative to the shaft body;
a projection projecting from an end face of the driven gear toward one side in an axial direction of the shaft body;
an elastic member adjacent to the projection in a circumferential direction of the shaft body; and
a fixed member arranged at the one side in the axial direction as viewed from the driven gear, wherein the fixed member is fixed to the shaft body, the fixed member includes an accommodation recess accommodating at least part of the projection and the elastic member, and the fixed member is configured to be rotated integrally with the shaft body, wherein
the projection includes an abutment side surface extending in the axial direction,
when the driven gear is rotated, the abutment side surface of the projection abuts against the elastic member and presses the elastic member against a wall of the accommodation recess to transmit torque from the driven gear to the fixed member,
the abutment side surface includes a basal end region that is continuous with the end face of the driven gear, an intermediate region that is continuous with the basal end region, and a distal end region that is continuous with the intermediate region, the distal end region of the abutment side surface includes an outer end at the one side in the axial direction, the outer end and the elastic member are spaced apart in the circumferential direction by a first distance when the intermediate region of the abutment side surface and the elastic member are in abutment without elastically deforming the elastic member, wherein the abutment side surface and the elastic member are in abutment during an entire period of operation, and the first distance is set so that the elastic member does not abut against the outer end even when the elastic member is elastically deformed by a maximum amount.

6. The balancer shaft according to claim 5, wherein the projection includes a distal end face, opposing the fixed member in the axial direction, and an arcuate surface, connecting the distal end face and the outer end.

7. The balancer shaft according to claim 5, wherein the abutment side surface includes a first end region, located at an inner side in a radial direction of the shaft body, and a second end region, located at an outer side in the radial direction of the shaft body, the first end region extends farther from the elastic member toward the inner side in the radial direction, the second end region extends farther from the elastic member toward the outer side in the radial direction, the abutment side surface includes a first end, located at the inner side in the radial direction of the shaft body, and a second end, located at the outer side in the radial direction of the shaft body;

each of the first end and the second end is spaced apart from the elastic member in the circumferential direction by a second distance when the abutment side surface and the elastic member are in abutment without elastically deforming the elastic member; and the second distance is set so that the elastic member does not abut against the first end and the second end even when the elastic member is elastically deformed by a maximum amount.

8. The balancer shaft according to claim 1, further comprising a plurality of elastic members, wherein the elastic member is one of the plurality of elastic members, and each of the elastic members is non-integral with every other elastic member of the plurality of elastic members.

9. The balancer shaft according to claim 1, further comprising a position projection extending from a surface of the elastic member closest to the fixed member.

10. The balancer shaft according to claim 9, wherein the fixed member further comprises a positioning hold configured to receive the position projection.

11. The balancer shaft according to claim 1, wherein a depth of the accommodation recess in the axial direction is greater than a height of the elastic member in the axial direction.

12. The balancer shaft according to claim 1, wherein a width of the shaft body through the fixed member is less than a width of the shaft body through the driven gear.

13. The balancer shaft according to claim 3, further comprising a plurality of elastic members, wherein the elastic member is one of the plurality of elastic members, and each of the elastic members is non-integral with every other elastic member of the plurality of elastic members.

14. The balancer shaft according to claim 3, further comprising a position projection extending from a surface of the elastic member closest to the fixed member, wherein the fixed member further comprises a positioning hold configured to receive the position projection.

15. The balancer shaft according to claim 3, wherein a depth of the accommodation recess in the axial direction is greater than a height of the elastic member in the axial direction.

16. The balancer shaft according to claim 3, wherein a width of the shaft body through the fixed member is less than a width of the shaft body through the driven gear.

17. The balancer shaft according to claim 5, further comprising a plurality of elastic members, wherein the elastic member is one of the plurality of elastic members, and each of the elastic members is non-integral with every other elastic member of the plurality of elastic members.

18. The balancer shaft according to claim 5, further comprising a position projection extending from a surface of the elastic member closest to the fixed member, wherein the fixed member further comprises a positioning hold configured to receive the position projection.

19. The balancer shaft according to claim 5, wherein a depth of the accommodation recess in the axial direction is greater than a height of the elastic member in the axial direction.

20. The balancer shaft according to claim 5, wherein a width of the shaft body through the fixed member is less than a width of the shaft body through the driven gear.

* * * * *